United States Patent [19]

Modic et al.

[11] 4,368,279

[45] Jan. 11, 1983

[54] METHOD FOR MECHANICALLY FOAMING SILICONE COMPOSITIONS

[75] Inventors: Frank J. Modic; Bruce E. Boudreau, both of Schenectady, N.Y.

[73] Assignee: General Electric Company, Waterford, N.Y.

[21] Appl. No.: 251,598

[22] Filed: Apr. 6, 1981

[51] Int. Cl.³ .............................................. C08J 9/30
[52] U.S. Cl. .................................... 521/122; 521/123; 521/154; 521/74
[58] Field of Search ........................ 521/154, 122, 74

[56] References Cited

U.S. PATENT DOCUMENTS

| | | | |
|---|---|---|---|
| 3,425,967 | 2/1969 | Modic | 521/154 |
| 3,677,981 | 7/1972 | Wada et al. | 521/154 |
| 3,730,931 | 5/1973 | Simon et al. | 521/74 |
| 3,923,705 | 12/1975 | Smith | 521/154 |
| 3,970,620 | 7/1976 | Ihde, Jr. | 521/74 |
| 4,024,091 | 5/1977 | Lee et al. | 521/154 |
| 4,026,842 | 5/1977 | Lee et al. | 521/154 |
| 4,026,845 | 5/1977 | Kim et al. | 521/154 |
| 4,108,833 | 8/1978 | Hatanaka et al. | 521/154 |
| 4,157,426 | 6/1979 | Hatanaka et al. | 521/154 |
| 4,189,545 | 2/1980 | Modic | 521/154 |

*Primary Examiner*—Morton Foelak

[57] ABSTRACT

A method for mechanically foaming a silicone composition comprising (1) beating a gas a silicone composition which may be SiH olefin platinum catalyzed composition, a condensation type of two-component RTV composition or condensation type of one-component RTV composition and then holding the foamed composition for at least 60 seconds under vacuum of at least 600 millimeters of mercury so as to allow the foam to gel and cure.

7 Claims, No Drawings

METHOD FOR MECHANICALLY FOAMING SILICONE COMPOSITIONS

BACKGROUND OF THE INVENTION

The present invention relates to a method for mechanically foaming silicone compositions and more particularly the present invention relates to mechanically foaming silicone compositions by beating air into them and allowing them to cure under a vacuum.

All of such compositions that are contemplated by the present invention are quick curing. That is they will gel or set up at a period of time varying from a few seconds to not more than 15 minutes. There are various types of silicone compositions.

One type of silicone composition is an SiH olefin platinum catalyzed composition which comprises as the basic ingredients a vinyl polysiloxane, a hydride polysiloxane cross-linking agent and a platinum curing catalyst. An example such a composition for instance is to be found in Modic U.S. Pat. No. 3,436,366 which is hereby incorporated by reference.

Another type of silicone composition which cures to silicone elastomer is what is known as a room temperature vulcanizable (hereinafter referred to as RTV) silicone composition in which the basic components of the composition in the case of the two-component composition comprises a silanol end-stopped polymer, an alkyl silicate cross-linking agent, and a metal salt as the curing promoter. Usually the alkyl silicate is packaged separately from the silanol polymer and when it is desired to cure the composition the two components are mixed and allow to stand at room temperature whereupon they cure to a silicone elastomer. An example of such a composition with preferred self-bonding additives is to be found in Lampe et al. U.S. Pat. No. 3,888,815 which is hereby incorporated by reference.

Another type of silicone composition that cures to a silicone elastomer upon standing is a one-component RTV composition. Such a composition is packaged in the substantial anhydrous state in a one-component package. When it is desired to cure the composition, the seal on the package is broken, the composition is applied and upon exposure to atmospheric moisture, it cures to a silicone elastomer. Although the composition will cure to a silicone elastomer, both in a one-component and two-component type without the presence of the curing promoter that is the metal salt nevertheless the presence of the metal salt enhances the cure that is tighter cure at a faster period of time is obtained with a metal salt present. An example of such a composition is for instance to be found in Kulpa U.S. Pat. No. 3,296,161 which is hereby incorporated by reference. The Kulpa patent discloses a preferred self-bonding additive in the composition that is a diacyloxy, dialkoxy silane as the preferred self-bonding additive.

There are other examples of such one-component RTV compositions, however, such will not be gone into detail here. Basically these compositions differ from each other in the type of cross-linking agent, type of metal salt and the type of fillers and other ingredients such as self-bonding additives.

Recently silicone foams have gained attention in the area of fire protection. Thus, it has been found that silicone foams are desirable fire protection media for filling panels and partitions to enclose electrical components and other sensitive instruments so as to protect them from fire. Also, silicone foam has demonstrated a good capability for resisting the spread of fire and smoke in partitions that have been insulated with such silicone foam. Examples of silicone foam that can be utilized for these purposes are for instance to be found as disclosed in Smith U.S. Pat. No. 3,923,705 which is hereby incorporated by reference. Basically this patent discloses reacting a silanol containing polymer with a hydride polysiloxane in a presence of a platinum catalyst to produce flame resisting silicone foam. Also note the fact of the disclosure of the Smith patent that the ingredients react to equilibrate hydrogen gas which foams the silicone composition which then cures to a silicone foam. It is disclosed in that Smith application that part of the silanol polymer can be a vinylsiloxane. Also note the disclosure in the patent application of Modic U.S. Pat. Ser. No. 103,881 which is hereby incorporated by reference which discloses the utilization of a high vinyl content hydride polysiloxane platinum catalyzed composition to produce a silicone foam. This application is also incorporated by reference.

There have been also other developments in this area for instance Nitzsche et al. U.S. Pat. No. 3,050,485 which is hereby incorporated by reference which discloses the production of a silicone foam by reacting a silanol polymer with a hydride polysiloxane in the presence of a tin salt. Again, this composition generates hydrogen gas which is liberated from the composition when it foams. These systems disclosed above are particularly the Modic and Smith generate the foaming gas insitu in the composition upon the components being mixed together. The older method was to include a blowing agent in the composition which upon heating the composition would decompose the blowing agent which would liberate a gas which would foam the silicone composition to a silicone foam which would then be cured at the elevated temperatures by heat. For example see the disclosure of Modic U.S. Pat. No. 3,425,967 which is hereby incorporated by reference.

As the disclosure of the foregoing Modic Patent indicates an external blowing agent would suitably foam the silicone composition to a silicone foam. However, these types of foams had several problems. First of all, a suitable blowing agent had to be found. Second of all, the incorporation of such blowing agent into the composition as well the maintenance of the shelf stability of the composition effected the shelf stability of the composition.

A more advantageous system was the one disclosed in the foregoing Modic U.S. Pat. Ser. No. 103,881 which was disclosed above in that the blowing agent or blowing gas was generated insitu by the ingredients. The difficulty with such a composition was that it was still somewhat expensive even though it did not have an external blowing agent and depended on a very accurate and precise measurement of the different ingredients that went into the composition as well as the use of a solubilized platinum complex otherwise a suitable foam was not formed. In addition these compositions generate hydrogen gas as the blowing agent which was flammable and which in certain situations might create problems during the preparation and curing of the foam.

It should be noted that the Nitzsche et al. foam is not desirable in the applications envisioned by the present case that is for fire resistance applications in that the Nitzsche et al. foam is not a fire resistant foam. Accordingly, it was highly desirable to arrive at a simple, inexpensive method for producing silicone foams not only from expensive silicone compositions but also from the more simplier and cheeper silicone compositions such that a cheep and effective foam could be formed rapidly and with ease.

Accordingly, it is one object of the present invention to provide a simple and efficient method for mechanically foaming an SiH-olefin platinum catalyzed composition.

It is an additional object of the present invention to provide a simple and efficient method for mechanically foaming a two-component condensation curing RTV composition.

It is still an additional object of the present invention to provide a mechanical method for simply and efficiently foaming a condensation curing one-component RTV system.

These and other objects of the present invention are accomplished by means of the disclosure set forth hereinbelow.

SUMMARY OF THE INVENTION

In accordance with the above objects there is provided by the present invention a method for mechanically foaming a silicone composition comprising (1) beating a gas into a composition having (A) 100 parts by weight of a base vinyl containing diorganopolysiloxane polymer having a vinyl content varying from 0.01 to 1.0 mole percent where the organo group other then vinyl is a monovalent hydrocarbon radical and the viscosity of the polymer varies from 100 to 200,000 centipoise at 25° C.; (B) from 1 to 50 parts by weight of a hydride polysiloxane cross-linking agent having a viscosity varying from 1 to 100 centipoise at 25° C. and a hydride content varying from 0.1 to 1.6 percent by weight and; (C) from 1 to 200 parts by million of solubilized platinum complex catalyst; (2) maintain the composition for at least 60 seconds under a vacuum of at least 600 millimeters of mercury to gel and cure the foam.

In accordance with the above objects, there is also a method for mechanically foaming a two-component room temperature vulcanizable silicone rubber composition comprising (1) beating a gas into a composition having (A) 100 parts by weight of a silanol terminated diorganopolysiloxane polymer of a viscosity varying from 100 to 200,000 centipoise at 25° C. where the organo group is a monovalent hydrocarbon radical; (B) from 0.1 to 15 parts by weight of a cross-linking agent and (C) from 0.1 to 10 parts by weight of curing promoter; (2) maintaining the composition under a vacuum of at least 600 millimeters of mercury for at least 5 minutes to gel and cure the foam. Where the cross-linking agent is a one-component cross-linking agent and the composition is packaged substantially anhydrously in a one-component package; then the composition is converted to a one-component RTV composition which can be foamed in the same manner to produce a silicone one-component RTV foam. Desirably there is incorporated in the one component system from 0.05 to 1 part of water immediately before or during the mixing or beating of gas into the composition.

Preferably in both two-component and one-component silanol condensation curing RTV systems, there is utilized a fast catalyst which is most preferably a tin salt selected from the class consisting of stannous octoate, dimethyl tin oleate, dibutyl tin oxide and dimethyl tin bis, neodecanoate the preferred tin catalyst is stannous octoate. However, the invention is not limited only to these fast tin catalysts and other types of fast catalysts such amine salts may be utilized in the present invention to allow the composition to set up in a maximum period of time of 15 minutes or less after the gas has been beaten into the uncured silicone composition so as to form a foam. Preferably the gas is air. However, any gas can be utilized. More details as to the mechanically foaming of the foam will be presented below.

DESCRIPTION OF THE PREFERRED EMBODIMENT

Irrespective of which composition is utilized to prepare a foam the process for mechanically foaming the material is very similiar. Thus, there can be utilized an Si-H olefin platinum catalyzed composition, a two-component condensation curing RTV composition or a one-component condensation curing RTV composition. Basically in the case of the Si-H olefin composition, the composition is agitated so that after it has been mixed and the gas beaten into it while at atmospheric pressure then while maintaining a vacuum at at least 600 millimeters of mercury over the system for at least 30 seconds and preferably for at least 60 seconds under the same vacuum so as to allow the composition to gel and cure to a foam.

The process for producing the foam for the two-component condensation curing RTV system and the one-component condensation curing RTV system is the same. In all cases that is the total viscosity of the composition at 25° C. cannot exceed 200,000 centipoise and more preferably does not exceed 100,000 centipoise at 25° C. Any type of agitation system can be utilized to beat air into the silicone composition. Thus, there can be utilized the ordinary egg beater. However, more professional type of mixing equipment are available for the beating of a gas into the silicone composition to produce a foam. It should be noted that any type of gas can be beaten into the composition to produce a foam. Preferably the gas is an inert gas and not a highly flammable gas. In terms of expense, it is most desirable to beat air into the silicone composition so as to produce a foam. The vacuum maintained over the composition during curing is preferably at least 100 millimeters of mercury is more preferably a vacuum of 20-50 millimeters of mercury vacuum. The vacuum should be maintained over the system while it is being cured into a foam as well as while it is gelling to a foam otherwise the foam would collapse before it the silicone composition has set. The reason for these limitations as far as the time for curing and maintaining the vacuum is that it is envisioned that this process would be utilized to produce foamed slab stock in a factory. It is not visualized that this process would be very effective in producing foam in a conduit or as is the case with the foregoing invention of Modic Ser. No. 103,881. The present invention is envisioned for being utilized in the factory to produce under vacuum producing equipment and optionally heating continuously slab foam which may then be cut to the appropriate size by the desired cutting equipment and whereupon then the construction worker can place the foam in a conduits or panels that are desired to be made fire resistant. Any type of mechanical mixing equipment can be utilized to mix or mechanically forth the foam. Examples of mixers that may be utilized are for instance as follows: Oakes mixers, Hobart mixers, lightening mixers, change can mixers.

The silanol condensation two-component RTV compositions are foamed in much the same manner under the same conditions. The system is cured at room temperature. However the necessary vacuum is maintained for the foregoing period of time and also there is the mechanical froathing of the system.

It should be appreciated that such silanol condensation curing systems have to have a fast catalyst in order to set up or gel by 15 minutes. Accordingly it is necessary that there be utilized a fast catalyst in such systems as will be explained below. However, it is not necessary for the systems to be heated. Specifically there is vacuum maintained on the system during mechanical frothing of the silicone system and also during the gellation period. The period can be anywhere from 5 to 15 minutes.

The upper limit of 15 minutes was taken as the upper practicle limit at which a factory process or conveyor line would be possible so as to allow the foam to set before the foam passes out of the vacuum chamber. Even though, the foam may not be completely cured after it passes out of its vacuum chamber, it should be set up so that it does not collapse upon the removal of the vacuum from the system. The upper limit of 15 minutes was taken as well for the Si-H olefin platinum catalyzed system but however such systems cure at much more rapid rates than the silanol condensation systems so accordingly in all actuality the cure time of the Si-H olefin platinum catalyzed foam will be in the range of 30 seconds to 5 minutes or less. This is the set up time of the foam during which a vacuum has to be maintained on the system.

Once the foam has set up then the silanol condensation curing system or the Si-H olefin platinum catalyzed system can be allowed to pass under the vacuum chamber on a conveyor belt and allowed to reach complete cure without the necessity for the continuing application of a vacuum over the system. The process for forming the one-component silanol curing condensation RTV system is much the same as for the silanol condensation curing two part system the only difference being is that in the two part system the two parts are mixed and mechanically foamed. Again in the one part silanol condensation curing system, it is necessary to have a fast catalyst in order that the composition set up in 15 minutes time as a maximum and more preferably set up in a time of 7-8 minutes under the necessary vacuum as been disclosed previously for the condensation curing two part RTV system. Again in the one part system as distinguished from the Si-H olefin platinum catalyzed system, preferably there is utilized no heating and the curing takes place at room temperature. This makes the process of the one-component and two-component RTV systems a little cheeper than the Si-H olefin platinum catalyzed composition system but on the other hand, these systems take a longer time to set up and require a longer vacuum chamber when carried out continuously then is the case with the Si-H olefin platinum catalyzed system which may set up in as little time as 30 seconds to 5 minutes.

It should be noted that the 15 minute upper limit for the application of a vacuum and heat or set up time has been defined previously is not a critical limit. If the process is carried batch wise, this time can be extended upwards as desired. It was estimated that for a continuous process, it would be desirable that the vacuum chamber be such that the total resinous time of the mechanically frothed foam in the vacuum chamber does not exceed 15 minutes, otherwise, it would appear the process would not be practicable.

Proceeding now to the different types of compositions that can be utilized to be mechanically frothed in the above manner one first proceeds to a Si-H olefin platinum catalyzed composition. In such composition, preferably the base vinyl-containing polysiloxane has the formula,

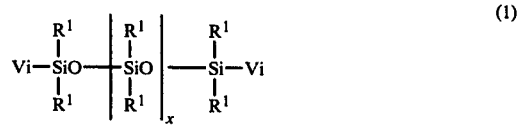

(1)

where Vi is vinyl and $R^1$ is a monovalent hydrocarbon radical and x varies such that the viscosity of the polymer varies from 100 to 200,000 centipoise at 25° C. and more preferably it varies from 1,000 to 100,000 centipoise at 25° C.

Perferably x varies such that the viscosity of the polymer varies from 1,000 to 100,000 centipoise at 25° C.; $R^1$ is a monovalent hydrocarbon radical.

In this specification when reference is made to a monovalent hydrocarbon radical, the following radicals are included: alkenyl radicals such as vinyl etc., alkenyl radicas such as vinyl allyl etc.; cycloalkyl radicals such as cyclohexyl, cyclohepyl etc.; mononuclear aryl radicals such as phenyl, methyl-phenyl etc.; fluroalkyl radicals such as 3,3,3-trifluoropropyl.

Per 100 parts of the base vinyl containing polymer which may contain aliphatic unsaturation on-chain but is preferably completely vinyl terminated there may be present from 5 to 30 parts by weight of a silica filler which is selected from the class consisting of fumed silica and percipitated silica. Reinforcing fillers can be utilized in a composition such as zinc oxide, diatomaceous earth and so forth that are disclosed for one-component RTV composition as stated in Beers Docket 60 SI-430 Ser. No. 196,887 which is hereby incorporated by reference. However, most preferably the filler is an reinforcing filler such as fumed silica or percipitated silica since it enhances the bubble formation in the foam. Too much of the silica filler is preferably not used since this unduly increases the viscosity. Thus, generally in any of the compositions of this invention, there is preferably utilized from 5 to 30 parts by weight of a silica filler which is preferably silica.

If the vinyl containing base polymer of Formula (1) above is of high viscosity it is preferred there be present a low viscosity second vinyl containing polymer so as to bring the viscosity of the total composition down. This is especially true if there is silica filler in the composition. Thus per 100 parts of the base vinyl containing polysiloxane, there may be preferably from 1-50 parts by weight of a second vinyl containing polysiloxane of the formula,

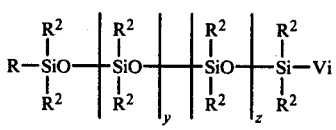

where Vi is vinyl $R^2$ is selected from the monovalent hydrocarbon radicals that do not have aliphatic unsaturation and y and z vary such that the viscosity of the polymer varies from 100 to 10,000 centipoise at 25° C. The $R^2$ can be any of the radicals previously given for $R^1$ of the compound of Formula (1) except it cannot be an alkenyl radical.

In place of the silica filler there may be added other reinforcing agents into the composition so as there may be further present in the composition per 100 parts of the base vinyl containing polymer from 10-50 parts by weight of an organopolysiloxane copolymer selected from compounds of the formula, $(R^{11})_3 SiO_{0.5}$ units and $SiO_2$ units where $R^{11}$ is a monovalent hydrocarbon radical with a ratio of monofunctional units to tetrafunctional units of 0.5 to 1:1 where the vinyl content varies from 2.5 to 10 mole percent and compounds composed of $R_3^{11} SiO_{0.5}$ units and $SiO_2$ and $R_2^{11} SiO$ units wherein the ratio of $R_3^{11} SiO_{0.5}$ units to $SiO_{0.2}$ units varies from 0.5 to 1:1 and the $R_2^{11} SiO$ units and the $OR_2^{11}SiO$ units are preferably present in an amount equal to to from about 1 to 10 mole percent based on the number of siloxane units and the amount of vinyl groups in the copolymer varies from 2.5 to 10.0 mole percent.

For more disclosure as to such reinforcing resins and vinyl containing Si-H olefin platinum catalyzed compositions, one is referred to U.S. Pat. No. 3,436,366 which is hereby incorporated by reference. For more disclosure as to the vinyl polymers of Formula (2) that are incorporation into a Si-H olefin platinum catalyzed compositions one is referred to the disclosure of Jerum and Striker U.S. Pat. No. 3,884,866 which is hereby incorporated by reference. Per 100 parts of the base polymer, there may be from 1-50 parts by weight of a hydride polysiloxane cross-linking agent. Preferably there is present from 1-20 parts by weight of the hydride polysiloxane cross-linking agent. The hydride resin can be a resin composed of

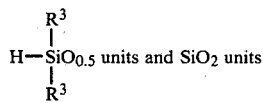

$H-SiO_{0.5}$ units and $SiO_2$ units in the ratio of 2 moles of the former to one mole of the latter. The organohydrogenpolysiloxane contains at least two silicon bonded hydrogen atoms per molecule. The $R^3$ radical can be any of the monovalent hydrocarbon radicals defined previously for $R^1$ except for alkenyl. The hydride resin can be also one which has difunctional siloxy units in it as disclosed in Jeram U.S. Pat. No. 4,041,010 and Jeram U.S. Pat. No. 4,029,629 which are hereby incorporated by reference.

It should be noted that any of the hydride resins disclosed in the foregoing Jeram Patents may be utilized in the instance invention. In accordance with the disclosure of the foreing Jeram patents with respect to fluorosilicone compositions, the same technology and the same type of hydride resins and hydride polysiloxanes may be utilized in the present composition even though the substituting groups are not fluoropropyl groups or fluoroalkyl groups. The hydride polysiloxane may be also be a linear hydride polysiloxane with preferably hydride terminal groups. Accordinly, preferably the hydride polysiloxane has the formula,

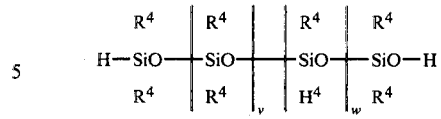

where $R^4$ is a monovalent hydrocarbon radical other than aliphatic unsaturated hydrocarbon radicals such as alkenyl and v and w vary such that the viscosity of the polymer varies from 10 to 1,000 centipoise at 25° C. These hydride polysiloxane cross-linking agents are disclosed in the foregoing Jeram Patents U.S. Pat. Nos. 4,041,010 and 4,029,629. The platinum catalyzed which is utilized is preferably a solubilized platinum catalyzed complex catalyst. By a solubilized platinum complex catalyst it is meant a complex preferably a siloxane complex with platinum which is soluble in the reactants. An example of such solubilized platinum complex catalyst is disclosed in Lamoneaux U.S. Pat. No. 3,220,972 and Karstadt U.S. Pat. No. 3,715,334. Preferably the catalyst is a solubilized platinum complex catalyst of Karstadt U.S. Pat. No. 3,715,334. The platinum complex catalyst comprises platinum complexed with a vinyl polysiloxane which may be in one case a low molecular weight linear polysiloxane or may be cyclic vinyl containing polysiloxane. These complex catalysts allow the reactants to react and set up much faster than would be possible if they were not present.

Accordingly, the set up and cured times disclosed above are possible with the solubilized platinum complex catalysts. If they are not utilized, longer set up times are needed. In addition there may be utilized mild inhibitors in the composition such as methyl vinyl cyclotetrapolysiloxanes. Thus, there may be incorporated into the composition from 10-10,000 parts per million of a methyl vinyl cyclotetrapolysiloxane as an inhibitor. Such an inhibitor will allow the two components of the Si-H olefin platinum catalyzed composition to be mechanically frothed to a foam before it starts to cure where upon after 5 minutes or so of mixing and frothing time, the composition would start to set up. The composition was heated was above 50° C. it would be a matter of seconds before the inhibitor was deactivated and the composition would start to set up. More effective inhibitors are known but are not referred to in the instant composition since they would extend the rate of cure of the composition. Accordingly only a mild inhibitor is desired in the instant composition so as to allow the composition a certain amount of both life after the components have been mixed before the composition starts to set up. The Si-H olefin platinum catalyzed composition are normally packaged such that the vinyl siloxane and the hydride as well as the platinum catalyst do not appear in one package. Normally the platinum catalyst is packaged with a portion of the vinyl siloxane and filler or vinyl resin and then the hydride is packaged with another portion of vinyl siloxane but without the platinum catalyst. When the compositions are mixed and there is present in one package, the hydride, the vinyl siloxane and the platinum catalyst the composition cures to a silicone elastomer once the inhibitor loses its effectiveness. There may be other components present in the composition, however, such will not be going into detail since that is within ability of a worker skilled in the art.

It should be noted that in order for the composition to be mechanically frothed into foam it is necessary that the total viscosity of a composition (this applies to the other systems also) does not exceed 200,000 centipoise at 25° C. and that preferably the viscosity of the total system does not exceed 100,000 centipoise at 25° C. and more preferably does not exceed 50,000 centipoise and is within the range of 10,000–50,000 centipoise at 25° C. Although foams may be formed above 200,000 centipoise, they are not good foams and although foams can be formed from a system whose total viscosity is less than 1,000 centipoise, the foams break up too quickly prior to setting up. Accordinly, it is highly desirable that the system have a viscosity within the above general or preferred ranges.

Accordingly proceeding to a two-component condensation curing RTV composition where the same viscosity limitations apply, the general process comprises (1) beating a gas into a composition having (A) 100 parts by weight of a silanol terminated diorganopolysiloxane polymer of a viscosity varying from 100 to 200,000 centipoise at 95° C. and more preferably of a viscosity varying from 1,000 to 100,000 centipoise at 25° C. where the organo group is a monovalent hydrocarbon radical; (B) from 0.1 to 15 parts by weight of a cross-linking agent; and (C) from 0.01 to 10 parts by weight of a curing promoter; (2) keeping the composition under a vacuum of at least 600 millimeters of mercury for at least 5 minutes to gel and cure the foam. Again as stated previously, it is not necessary to heat this system but the same vacuum limitations and mechanically frothing conditions apply with respect to this system as was recited with respect to Si-H olefin platinum catalyzed composition. The composition may be heated for 50°–150° C. for a period of time varing from 5 minutes to not exceeding 15 minutes but this is not necessary. It should be kept under the same foregoing vacuum and preferably a vacuum of 100 millimeters of mercury or from 20–50 millimeters of mercury for 5 to not exceeding 15 minutes so as to allow the foam to gel and set up so that it does not collape prior to cure.

A longer period of time is necessary to allow the composition to gel as compared to the Si-H olefin system and the period will be usually at least 5 minutes and can be up to but not exceeding 15 minutes in accordance with the conditions set forth previously. It should be noted that if the process of producing the foam is carried out batch wise, when the period for gelling of the foam can exceed 15 minutes and to as much as is desired. However for a continuous process, a maximum of 15 minutes set up time is desirable under vacuum.

For a two-component RTV system, the cross-linking agent may be an alkyl silicate of the formula,

and partial hydrolysis products thereof where $R^5$, $R^6$ are monovalent hydrocarbon radicals and m is 0 or 1. The radicals $R^5$ and $R^6$ can be any of the monovalent hydrocarbon radicals previously disclosed for $R^1$ in Formula (1). In this composition, there may be anywhere from 5 to 30 parts of silica filler or reinforcing fillers much as was the case with the Si-H olefin platinum catalyzed composition. Any of the extending fillers disclosed previously for the Si-H olefin composition can be utilized in the system. Preferably the filler is 5 to 30 parts by weight of a silica filler which is a reinforcing filler selected from fumed silica and percipitated silica and most preferably fumed silica. Again a silica filler is preferred since it causes the composition to foam better. However, too much silica filler is not desirable since it will unduly increase the viscosity of the composition such that it will be difficult to foam.

If too much of the silica filler is present, the composition will be difficult to foam. In the two part RTV composition, there may be present from 0.5 to 1 parts of water per 100 parts of the base silanol polymer.

An important part of such composition is that there must be a fast curing promoter, that is the curing promoter must be able to set up the composition at room temperature or gel the composition at room temperature after being mixed in a period of time of at least 5 minutes and not exceeding 15 minutes.

Preferably the curing promoter is a tin salt which may be a tin salt of carboxylic acid. Examples of tin salts which may be utilized are stannous octoate, dibutyl tin oxide, dimethyl tin oleate, dimethyl tin acetate and dimethyl tin bis neodecanodate. The preferred tin salt is stannous octoate.

Platinum in the composition would act as a flame retardant. Carbon black in the composition will also act as a flame retardant. Preferably part of the filler that is utilized in the concentrationn disclosed above may be carbon black. Generally there may be utilized anywhere from 5 to 15 parts of carbon black in the composition as a flame retardant and desirably in combination with 5 to 200 parts per million of platinum. There may be added other additives which are well known in the art such as self-bonding additives as disclosed in the foregoing Lampe et al. U.S. Pat. No. 3,888,815 which is hereby incorporated by reference. The silanol terminated base polymer is preferably a linear polymer which has the formula,

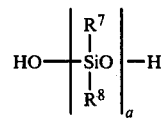

where $R^7$, $R^8$ are monovalent hydrocarbon radicals and a varies such that the viscosity of the polymer varies from 100 to 200,000 centipoise at 25° C. and more preferably it varies from 10,000 to 100,000 centipoise at 25° C.

In place of the alkyl silicate cross-linking agent in the two-component RTV system, there may be utilized a resinous copolymer such as a cross-linking agent composed of $R_3^9 SiO_{0.5}$ units and $SiO_2$ units where the ratio of $R^9$ to Si groups varies from 1.0 to 1.5 and $R^9$ is a monovalent hydrocarbon radical such as the radicals disclosed for $R^1$ of the compound of Formula 1. Examples of such compositions, for instance is disclosed in Modic U.S. Pat. No. 2,979,479 which is hereby incorporated by reference. These compositions are preferably devolatilized prior to being foamed as for instance disclosed in Modic U.S. Pat. No. 3,205,283 which is hereby incorporated by reference. Again with this different type of cross-linking agent there may be utilized the same fillers in the same quantities. Preferably the composition is solventless as was the two part RTV silanol condensation system with the alkyl silicate cross-linking agent with one of the fast tin salts catalyst. The viscosity, vacuum, and other limitations apply to this composition as was the case with the alkyl silicate two part RTV composition.

The viscosity limitations that were disclosed previously for the Si-H olefin composition applied to this composition as well as the alkyl silicate composition and the foaming conditions described for the alkyl silicate two part silanol condensation curing composition apply to this composition also. Again with this composition, the other additives may be added as was the case with the alkyl silicate condensation curing for the same reasons.

Finally there is a method for mechanically foaming one-component room temperature vulcanizable silicone rubber composition comprising (1) beating a gas such as air into a one-component room temperature silicone composition which cures upon exposure to atmospheric moisture having (A) 100 parts by weight of a silanol terminated diorganopolysiloxane base polymer of a viscosity varying from 100 to 200,000 centipoise at 25° C. where the organo group is a monovalent hydrocarbon radical; (B) from 0.1 to 15 parts by weight of a cross-linking agent (C) from 0.01 to 10 parts by weight of a curing promoter selected from the class consisting of tin salts and amine salts and (E) from 0.05 to 1.0 part of water and allowing the composition to cure to a silicone elastomer at room termperature. Again the viscosity limitations apply to this total composition.

The composition is mechanically frothed into a foam under a vacuum of at least 600 millimeters of mercury and more preferably at a vacuum of 100 millimeters of mercury and even more preferably a vacuum of 20 to 50 millimeters of mercury, where the vacuum is maintained for a period of 5 minutes and does not exceed 15 minutes until the composition cures up or gels up to a foam such that when the vacuum is removed, the foam does not collapse. Although, the composition may be heated during the gelling of the foam, no great advantage is obtained and as a matter of fact, the expense of the process can be significantly reduced by carrying out the gelling of the foam at room temperature. Preferably the silanol terminated base polymer as was the case where the two part RTV composition has a viscosity varying from 1,000 to 90,000 centipoise at 25° C. and preferably has a formula,

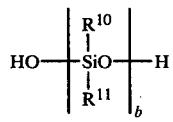

where $R^{10}$, $R^{11}$ are monovalent hydrocarbon radicals and b varies such that the viscosity of the polymer varies from 1,000 to 200,000 centipoise at 25° C. more preferably varies it from 10,000 to 100,000 centipoise at 25° C.

Again the same types of fillers may be utilized in this composition as was utilized in the two-component silanol condensation curing RTV system. Again the same type and amounts of silica filler may be utilized in the composition as well as extending fillers. Most preferably, it is utilized from 5 to 30 parts by weight of a silica filler selected from the class consisting of fumed silica and percipitated silica. The filler is preferably silica filler, again there may be utilized as a curing promoter the foregoing concentration of a tin salt which is preferably one of the fast tin salt catalyst as identified previously for the two part silanol condensation curing RTV. With respect to the cross-linking agents, the cross-linking agents may vary within a wide amine.

Thus there may be utilized as a cross-linking agent an amine functional silicone of the formula,

where $R^{12}$ is a monovalent hydrocarbon radical, and $R^{13}$, $R^{14}$ are selected from the class consisting of hydrogen and monovalent hydrocarbon radicals, c is a number which 0 or 1. It should be noted that in the foregoing definition, by monovalent hydrocarbon radicals is meant any of the monovalent hydrocarbon radicals previously defined for $R^1$ of Formula (1).

Further, the cross-linking agent may be one that has the formula,

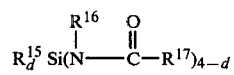

where $R^{15}$, $R^{17}$ are monovalent hydrocarbon radicals, $R^{16}$ is selected from the class consisting of hydrogen and monovalent hydrocarbon radicals and d is a number that is 0, 1 or 2. By monovalent hydrocarbon radicals for $R^{15}$, $R^{16}$ and $R^{17}$ there is encompassed the definition of the $R^1$ radical given previously for Formula (1) above. In addition for a more definite description as to such cross-linking agents as those above defined one is referred to the disclosure of Suttlegger et al. U.S. Pat. No. 3,378,520 which is hereby incorporated by reference. For the amine cross-linking agent reference is to Nitzsche et al. U.S. Pat. No. 3,032,528 which is hereby incorporated by reference for a disclosure of the prior referred cross-linking agent system. Another type of cross-linking agent system that may be utilized is an aminoxy silicone compound having from 1 to 100 silica atoms per molecule and from 3 to 10 aminoxy groups per molecule; said aminoxy group having a general formula, —OX in which X is a monovalent amine radical selected from the group consisting of —NR$_2^{18}$ and a heterocyclic amine, $R^{18}$ is a monovalent hydrocarbon radical, the —OX group being bonded to silicone atoms through an SiO bond, the remaining valences of the silicone atoms in the aminoxy silicone compound being satisfied by divalent oxygen atoms which link the silicone atoms of the aminoxy silicone compound having two or more silicone atoms per molecule through silicone-oxygen silicone atoms bonds and by monovalent radicals bonded to the silicone atoms through silicone carbon bonds and there being on the average of at least one monovalent hydrocarbon radical per silicone atom. For more information as to such compounds and cross-linking agents when it is referred to the disclosure of the following U.S. Pat. Nos. 3,296,199; 3,341,486; 3,379,659; 3,441,583; 3,484,471 which are hereby incorporated by reference.

With the foregoing aminoxy cross-linking agent, there is preferrably utilized from 1 to 5 parts by weight of a coupler compound per 100 parts of the base silanol polymer wherein the coupler compound has the formula,

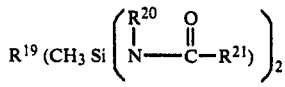

where $R^{19}$, $R^{20}$ and $R^{21}$ are monovalent hydrocarbon radicals which are the same monovalent hydrocarbon radicals previously defined for the $R^1$ radical of Formula 1. For more information as to such coupler compounds one is referred to the disclosure of Torpercer U.S. Pat. No. 3,817,909 which is hereby incorporated by reference.

The cross-linking agent can also be a ketoxime functional silane of the formula,

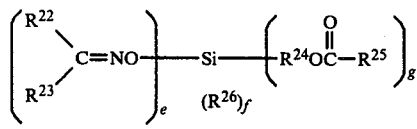

where $R^{22}$, $R^{23}$, $R^{25}$, and $R^{26}$ are monovalent hydrocarbon radicals, $R^{24}$ is a saturated divalent hydrocarbon radical, e is an integer from 1 to 3, g is an integer from 1 to 3, f is a number from 0 to 2 and the sum of e.g. and t is 4. For more information as to such ketoxime functional one-component RTV systems one is referred to the disclosure of Beers et al. U.S. Pat. No. 3,962,160 which is hereby incorporated by reference.

Another type of cross-linking system that can be utilized to produce a one-component RTV system that can be mechanically frothed in accordance with the instant invention is one where the cross-linking agent has the formula,

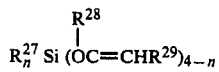

where $R^{27}$, $R^{28}$ are monovalent hydrocarbon radicals as defined previously for the $R^1$ radical of Formula 1 and n is 0 or 1. Then systems are disclosed in Takago et al. U.S. Pat. Nos. 3,819,563 and Takago 4,180,642

Finally the cross-linking agent may be acyloxy functional silane of the formula,

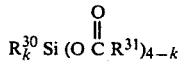

where $R^{30}$ is a monovalent hydrocarbon radical of 1 to 8 carbon atoms and $R^{31}$ is a monovalent hydrocarbon radical of 1 to 20 carbon atoms and k is 0 or 1. The radicals $R^{30}$ and $R^{31}$ can be any of the monovalent previously defined for $R^1$ of Formula 1. Most preferably, $R^{30}$ is an alkyl radical of 1 to 8 carbon atoms and $R^{31}$ is an alkyl radical of 1 to 16 carbon atoms. Preferably the cross-linking agent is a methyl triacetoxysilane or it can be methyl tris (2-ethyl hexanoxy) silane. Other preferred cross-linking agents within the scope of the above Formula is methyl trisbenoxy silane.

It should be noted that desirably any of the one-component systems disclosed above with the appropriate curing promoters, that is a fast curing promoter can be formulated so that a foam can be produced by mechanically foaming the composition in accordance with the instant invention.

There may be added other ingredients to the basic one-component RTV system as is well known in the art. Thus, there may be added per 100 parts of the base silanol polymer from 2 to 30 parts by weight of a fluid polysiloxane containing a high degree of trifunctionality or mixture of difunctionality and comprising (i) from 3 to 60 mole percent of monoorganosiloxy units, siloxy units, or a mixture of such units;
(ii) from 1 to 6 mole percent of triorganosiloxy units; and
(iii) from 34 to 96 mole percent of diorganosiloxy units, said polysiloxane containing from about 0.1 to about 2 percent by weight of silane-bonded hydroxyl group units and where the organo group is a monovalent hydrocarbon radical. For more detail as to such trifunctional fluids one is referred to the disclosure of Beers U.S. Pat. No. 3,382,205 which is hereby incorporated by reference. To this basic composition, there may be added adhesion promoters such as 0.1 to 10 parts by weight of an adhesion promoter such as dialkoxydiacyloxysilane of Kulpa U.S. Pat. No. 3,296,161 which was referred to previously. There also may be added other adhesion promoters such as a silyl maleate, silyl fumerate and silyl phtheate adhesion promoters of Mitchell et al. Ser. No. 16,254 which is hereby incorporated by reference. It should be noted that any desirable adhesion promoters may be utilized in the instant invention.

It can be appreciated that many different types of adhesion promoters and various other types of additives can be added to the composition as long as they don't affect the one-component's composition ability to foam. There must be a sufficiently fast catalyst in the system so that the the composition sets up at a minimum of 5 minutes and a maximum that does not exceed 5 minutes if the foam composition is to be produced continuously. If it is first produced batch wise, any time limitation may be utilized as desired and as stated previously with the other compositions.

Accordingly, a cross-linking agent and curing promoter must be utilized of which the above are exemplary so that the composition will set up or gell desirably at of 5 minutes and not exceeding 15 minutes. In addition, the viscosity limitation which were defined previously for the Si-H olefin platinum catalyzed composition apply also to these one-component RTV silanol condensation curing systems. Any of the mechanical systems indicated previously for the foaming of the Si-H olefin platinum catalyzed compositions can be utilized to foam either a silanol condensation curing two part RTV systems or one part RTV systems. In addition the desired necessary vacuum is to be maintained. Finally, it must be pointed out that the above cross-linking agent systems for one-component RTV systems is representative and is not intended to be all encompassing.

Other one-component RTV systems with the appropriate curing promoters in which the viscosity limitations can be met as defined previously and in which the composition can be mechanically beaten into a foam and which will set up and gel within the time limits set forth previously can also be utilized in the present invention for a continuous forming system. If is a continuous system is not desired, then the time limitations are not important.

The examples below are given for the purpose of illustrating the present invention. They are not given for any purpose of setting limits and boundaries to the present invention. All parts in the examples are by weight.

EXAMPLE 1

To 50 grams of 3600 cps. of vinyl terminated dimethyl polysiloxane containing 5.3 mole percent diphenyl units was added 10 ppm platinum in the form of the divinyl tetramethyl disiloxane complex of Karstedt U.S. Pat. No. 3,715,334. When 5 grams of a curing agent consisting of 2.5 grams of the above vinyl copolymer and 2.5 grams of a hydride polysiloxane polymer (containing $H(CH_3)_{0.5}$ units and $SiO_2$ units where the ratio of the polymer to the later is 2.0 and a hydride content of 0.086) was mixed with the 50 grams of the above platinum containing vinyl copolymer, the system cured extremely rapidly within 60-90 seconds at room temperature, $77° + 2°$ F. the cured specific gravity was 0.99.

This same system, the 50 grams of the platinum containing polyorganosiloxane and the 5 grams of curing composition were stirred vigorously in a 6 ox paper cup and immediately placed in a vacuum chamber and a controlled partial vacuum was applied. After 3 minutes, the resulting cured foam was removed from the vacuum chamber. The resulting cured foam had a very uniform cell size and a measured specific gravity of 0.31.

In another experiments, the same system was again stirred vigorously and immediately placed in a vacuum chamber and full vacuum was applied; 20 mm $H_g$. The uniform foam that resulted had a specific gravity of 0.20.

EXAMPLE 2

A room temperature one-component flowable RTV having a viscosity of 25,000 cps. was mechanically foamed as follows:

The flowable composition consisted of 100 parts of a 3000 cps. silanol terminated polydimethylsiloxane, 12 parts of a mono, di, trihydrolyzate containing 3 mole percent trimethyl siloxy units, 20 mole percent methyl siloxy units, 77 mole percent dimethyl siloxy units and containing 0.5 weight percent silanol, 17 parts of a fumed silica filler with a surface area of 200 $m^2/_{gm}$. To this composition was added 5 percent by weight of catalyst solution consisting of 4 parts of methyl triacetoxy silane, 1 part of a diteruiry butoxy diacetoxy silane, and 0.032 parts of dibutyl tin dilaurate.

50 grams of this flowable composition was weighed into a 6 oz. paper cup, 0.05 gms of water was added and the composition was stirred vigorously for 20 seconds. The cup was placed in a vacuum disicator and the vacuum was applied slowly over a period of 2 to 3 minutes to reach 10 mm $H_g$ pressure causing the composition to foam and almost fill the cup. The vacuum was maintained for 10 minutes to allow the foam to cure.

EXAMPLE 3

A two-component silanol composition having a viscosity of 40,000 cps. was prepared by compounding 100 parts of a 9,000 cps. silanol terminated dimethylpolysiloxane, 40 parts of calcium carbonate filler, 20 parts of zinc oxide filler, 3 parts of condensed ethyl silicate containing 40 percent $SiO_2$, and 0.1 part water.

To 50 grams of the above two-component silanol composition in a 6 oz. cup, was added 0.5 percent stannous octoate. The mixture was stirred vigorously for 20 seconds and then placed in the vacuum chamber. The vacuum was applied slowly over a period of 5 minutes to reach 5 mm $H_g$ pressure causing the silanol composition to foam and almost fill the cup. The vacuum was maintained for another 10 minutes to allow the foam to gel and cure enough to maintain its foam shape.

We claim:

1. In a method for producing a silicone foam composition wherein said silicone is a curable silicone elastomer comprised of a crosslinkable polydiorganosiloxane base polymer having a viscosity of from 100 to 200,000 centipoise at 25° C., a crosslinking agent and an amount of curing catalyst effective for promoting a cross-linking cure reaction between said polydiorganosiloxane base polymers and said crosslinking agent thereby providing an elastomeric silicone composition, the improvement which consists essentially of:

mechanically beating an inert gas into a mixture of said curable silicone elastomer to foam said silicone elastomer; gelling said curable silicone elastomer under a vacuum of at least 600 mm Hg for at least 60 seconds in the substantial absence of either an external or in situ blowing agent thereby setting-up a foam of said curable silicone elastomer; curing said foam of said silicone elastomer at a temperature of at least 20° C., thereby providing a cured silicone elastomer foam.

2. A method as in claim 1 wherein said curable silicone elastomer is a silicon hydride-platinum catalyzed composition having a vinyl-containing diorganopolysiloxane base polymer.

3. A method as in claim 1 wherein said curable silicone elastomer is a condensation curable composition having a silanol functional diorganopolysiloxane base polymer.

4. A method as in claim 1 wherein the viscosity of said curable silicone elastomer does not exceed 100,000 centipoise at 25° C.

5. A method as in claim 1 wherein the vacuum is at least 100 mm Hg.

6. A method as in claim 5 wherein the composition is heated at a temperature of from 25° C. to 150° C. for a period of 30 seconds to 15 minutes.

7. A method as in claim 1 wherein said curable silicone elastomer further contains a filler.

* * * * *